United States Patent
Johnson et al.

(10) Patent No.: US 10,082,388 B2
(45) Date of Patent: Sep. 25, 2018

(54) METHOD AND APPARATUS FOR MEASURING PERIMETER OF SWIMMING POOLS

(71) Applicant: Tara Manufacturing Inc., Owens Crossroads, AL (US)

(72) Inventors: Jerry W. Johnson, Huntsville, AL (US); Michael Kranz, Elkmont, AL (US)

(73) Assignee: TARA MANUFACTURING, INC., Owens Cross Roads, AL (US)

( * ) Notice: Subject to any disclaimer, the term of this patent is extended or adjusted under 35 U.S.C. 154(b) by 0 days.

(21) Appl. No.: 14/680,497

(22) Filed: Apr. 7, 2015

(65) Prior Publication Data

US 2015/0309176 A1 Oct. 29, 2015

Related U.S. Application Data

(60) Provisional application No. 61/995,286, filed on Apr. 7, 2014.

(51) Int. Cl.
*G01C 3/08* (2006.01)
*G01B 11/24* (2006.01)
(Continued)

(52) U.S. Cl.
CPC ............. *G01B 11/24* (2013.01); *G01S 7/003* (2013.01); *G01S 7/4817* (2013.01); *G01S 17/08* (2013.01);
(Continued)

(58) Field of Classification Search
CPC ....... G01B 11/24; G01S 7/003; G01S 7/4817; G01S 17/08; G01S 17/42; G01S 17/88; G01S 7/497
See application file for complete search history.

(56) References Cited

U.S. PATENT DOCUMENTS

2002/0182339 A1* 12/2002 Taylor ................... C08F 283/10
427/510
2006/0048882 A1* 3/2006 Swain ................... C04B 41/009
156/71

(Continued)

OTHER PUBLICATIONS

"Rust-oleum". Zinsser Pool Paint, Product Overview and MSDS/TDS Technical Info. (2013). http://www.rustoleum.com/product-catalog/consumer-brands/zinsser/specialty-coatings/pool-paint.*

(Continued)

*Primary Examiner* — Samantha K Abraham
(74) *Attorney, Agent, or Firm* — Jeremy A. Smith; Bradley Arant Boult Cummings LLP

(57) ABSTRACT

A method of measuring the perimeter of a swimming pool has been developed. First, a laser measurement device with a rotary motor is placed on a tripod. Next, the device and tripod are located and leveled the laser measurement in an empty swimming pool and the scan sequence is initiated. The laser measurement device is calibrated and then begins collecting a data measurement of the distance from the side of the swimming pool to the laser measurement device. The laser measurement device is rotated laterally at a defined angle to a new position using the rotary motor and the process of collecting a new data measurement is repeated until the laser measurement device has rotated 360°.

6 Claims, 8 Drawing Sheets

(51) Int. Cl.
*G01S 17/42* (2006.01)
*G01S 17/08* (2006.01)
*G01S 17/88* (2006.01)
*G01S 7/00* (2006.01)
*G01S 7/481* (2006.01)
*G01S 7/497* (2006.01)

(52) U.S. Cl.
CPC ............... *G01S 17/42* (2013.01); *G01S 17/88* (2013.01); *G01S 7/497* (2013.01)

(56) References Cited

U.S. PATENT DOCUMENTS

| | | | |
|---|---|---|---|
| 2008/0084318 A1* | 4/2008 | Fogelson | G08B 21/082 340/573.6 |
| 2008/0246974 A1* | 10/2008 | Wilson | G01B 11/24 356/634 |
| 2011/0288816 A1* | 11/2011 | Thierman | G01C 15/002 702/151 |

OTHER PUBLICATIONS

"Rust-oleum". Zinsser Technical Data: Swimming Pool Paint (found as a link on Reference "U" page, under MSDS/TDS Technical Info section). (2013). http://www.rustoleum.com/-/media/DigitalEncyclopedia/Documents/RustoleumUSA/TDS/English/CBG/Zinsser/ZNR-01_Swimming_Pool_Paint_TDS.ashx.*

"Wayfair". Zinsser 5-gal. White Flat Oil-Based Swimming Pool Paint: Product Overview and Specifications. (2015). http://www.decideproduct.com/zinsser/5-gal.white-flat-oil-based-swimming-pool-paint_4269306.html.*

"ASTM International". ASTM D436-37 (1955). (1996-2016). http://www.astm.org/Standards/D436.htm.*

"Spray". El Hada de Papel website. Aug. 5, 2012. http://www.elhadadepapel.com/en/spray/.*

* cited by examiner

METHOD AND APPARATUS FOR MEASURING PERIMETER OF SWIMMING POOLS

CROSS REFERENCE TO OTHER APPLICATIONS

This application claims priority to, and the benefit of, pending U.S. Provisional Patent Application No. 61/995,286 filed on Apr. 7, 2014 titled "Method and Apparatus for Measuring Perimeter of Swimming Pools."

FIELD OF THE DISCLOSURE

The present disclosure pertains to the field of swimming pools. More specifically, the present disclosure pertains to an improved method and apparatus for measuring a liner for a swimming pool.

BACKGROUND

Swimming pools typically have a polymeric liner along their insider surface that serves several functions including, without limitation, providing a water impermeable surface, providing an aesthetically pleasing cover to the concrete or metal pool walls/floor and providing a pleasing to the touch contact surface with those enjoying the pool. However, given the nature of the materials used in the construction of pool liners, they must be replaced every few years due to wear-and-tear on the liner. Before a pool liner can be replaced, an accurate measurement of the perimeter and depth of the pool must be made and, as discussed below, the prior art method of measuring the perimeter of the pool is time consuming and error prone leading to costly waste for both the consumer, the pool liner installers and the pool liner manufacturers. According, it is desirable to have an improved method and apparatus for the measurement of the perimeter of a swimming pool before ordering a replacement pool liner. An improved method and apparatus are provided herein.

As shown in FIG. 1, the prior art method and apparatus used to measure the perimeter 50 of a pool 10 for a replacement pool liner 40 involves "A-B point-to-point-triangulation" wherein two reference points 20A and 20B are placed on the ground with a straight line between them (that does not intersect the perimeter 50 of the pool 10) and a series of measurements are made to a plurality of points X along the perimeter 50. The size and shape of the pool 10 dictate how many points X must be placed along the perimeter 50 to obtain an accurate measurement. As shown in FIG. 1, the points X must be spaced closer together in curved regions of the perimeter 50 than straighter regions of the perimeter 50 (compare the spacing of points $X_{17}$-$X_{27}$ to that of $X_1$-$X_5$) in order to obtain accurate measurements of the perimeter of the curved region of the perimeter 50. Additionally, at times, the size and shape of the entrance to the pool 10, such as stairs 30, must be taken into account during the measurement process. Once a satisfactory number of points X have been placed along the perimeter 50, by the use of a tape measure or other hand held measuring device, a series of measurements from each point X to each reference point 20A, 20B must be made. As shown by example in Fig, 1, the distance from point $X_1$ to reference point 20A and to reference point 20B must be determined by measuring the length of the line $AX_1$ and $BX_1$ respectively. Likewise, a similar calculation must be made for every point X along the perimeter 50. Other exemplary lines of measurement are shown in FIG. 1 including $AX_3$, $BX_3$, $AX_{17}$, $BX_{17}$, $AX_{27}$ and $BX_{27}$. As expected, the errors and inefficacies inserted in making this many measurements can be great. These measurements then must be transferred to the pool liner manufacturer who then fabricates the pool liner 40. At times, the errors generating in manually measuring the perimeter 50 are so great that the pool liner 40 cannot be fitted to the pool 10. Given applicant's experience in the pool liner industry, the errors associated with the prior art method of measuring the perimeter 50 of the pool 10 could exceed 40 million dollars per year.

DEFINITIONS

With reference in the specification to "an embodiment," "one embodiment," "various embodiments," or any variant means that a particular feature or aspect of the invention described in conjunction with the particular embodiment is included in at least one embodiment of the present invention.

The term "about" as used refers to a value that may vary within the range of expected error inherent in typical measurement techniques known in the art.

The terms "storage device" or "storage medium" as used refers to a machine-readable device/medium that retains data that can be read by mechanical, optical, or electronic means, for example by a computer. Such devices are sometimes referred to as "memory," although as used herein a machine-readable data storage device cannot include a human mind in whole or in part, including human memory. A storage device/medium may be classified as primary, secondary, tertiary, or off-line storage. Examples of a storage device/medium that is primary storage include the register of a central processing unit, the cache of a central processing unit, and random-access memory ("RAM") that is accessible to a central processing unit via a memory bus, a static random access memory ("SRAM"), a dynamic random access memory ("DRAM"), an electronically erasable programmable read-only memory ("EEPROM") and a programmable read-only memory ("PROM"). Primary storage is generally volatile memory, which has the advantage of being rapidly accessible. A storage device that is secondary storage is not directly accessible to the central processing unit, but is accessible to the central processing unit via an input/output channel. Examples of a storage device/medium that is secondary storage include a mass storage device, such as a magnetic hard disk, an optical disk, a drum drive, flash memory, a floppy disk, a magnetic tape, an optical tape, a paper tape, and a plurality of punch cards. A storage device/medium that is tertiary storage is not connected to the central processing unit until it is needed, generally accessed robotically. Examples of a storage device/medium that is tertiary storage may be any storage device that is suitable for secondary storage, but configured such that it is not constantly connected to the central processing unit. A storage device/medium that is off-line storage is not connected to the central processing unit, and does not become so connected without human intervention. Examples of a storage device/medium that is off-line storage may be any storage device that is suitable for secondary storage, but configured such that it is not constantly connected to the central processing unit, and does not become so connected without human intervention (such as "cloud computing"). Secondary, tertiary, and offline storage devices/mediums are generally non-volatile, which has the advantage of requiring no source of electrical current to maintain the recorded information. A storage device/medium excludes signals, carrier waves and other similar transitory propagating signals.

The term "processor" or "central processing unit" ("CPU") as used refers to a software execution device capable of executing a sequence of instructions ("program"). The CPU includes an arithmetic logic unit, and may further include one or both of a register and cache memory.

The term "machine-readable format" or "machine-readable storage" as used refers to a tangible medium of storing information that is configured to be read by a machine or processor. Such formats include magnetic media, optical media, and paper media (punch cards, paper tape, etc.). Printed writing in a human language, if not intended or configured to be read by a machine, is not considered a machine readable format or machine-readable storage. In no case shall a human mind be construed as machine readable format or machine-readable storage. Further, neither machine readable format nor machine-readable storage shall be construed to include any form of transitory tangible media.

The term "database" as used refers to an organized data structure comprising a plurality of records stored in machine-readable format or machine-readable storage.

BRIEF DESCRIPTION OF THE DRAWINGS

To further advantages and features of the present disclosure, a more particular description of the invention will be rendered by reference to specific embodiments thereof which are illustrated in the appended drawings. It is appreciated that these drawings are not to be considered limiting in scope. The invention will be described and explained with additional specificity and detail through the use of the accompanying drawings in which.

SUMMARY OF THE DISCLOSURE

Figure 1:
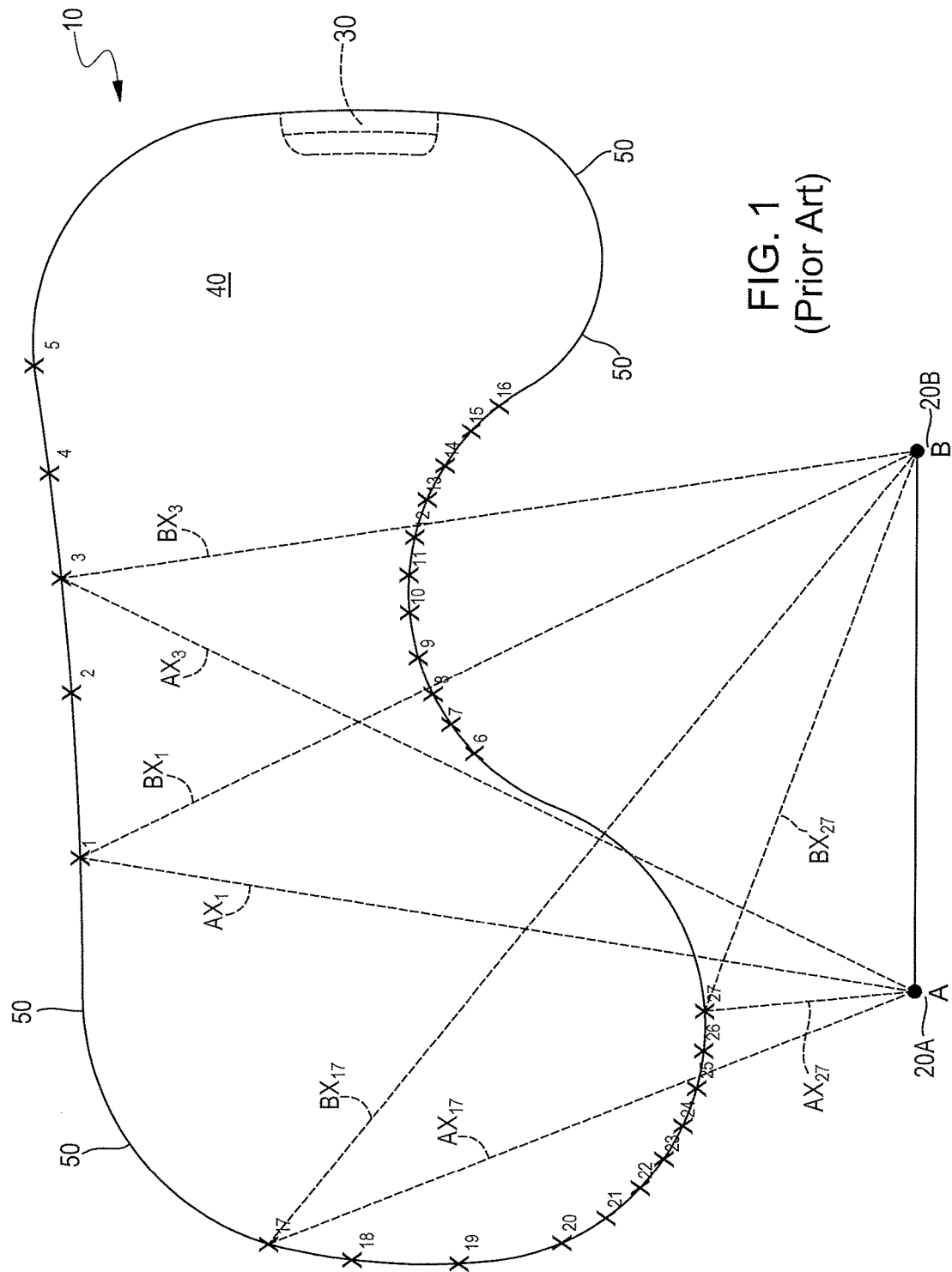
FIG. 1 shows the prior art method of measuring the perimeter of a pool for the fitment of a replacement pool liner.
Figure 2:
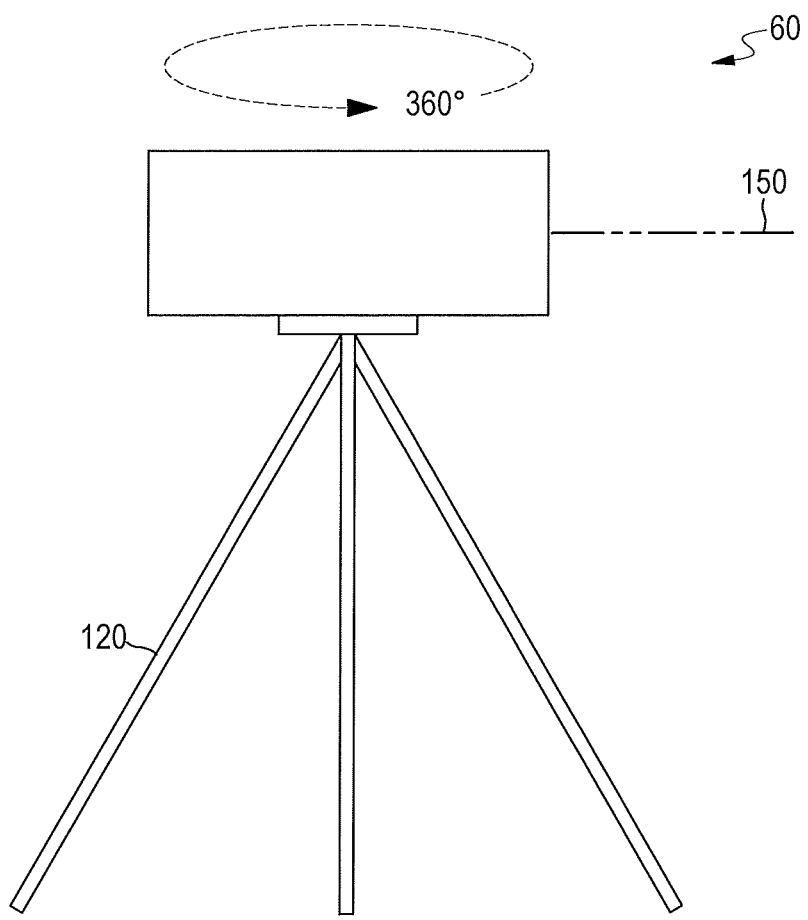
FIG. 2 shows a diagram of the laser measurement device mounted on a tripod in accordance with one embodiment of the present invention.

In one aspect, the present disclosure provides a method of measuring the perimeter of a swimming pool, comprising: placing a laser measurement device with a rotary motor on a tripod; locating and leveling the laser measurement device and tripod in an empty swimming pool; initiating a scan sequence on the laser measurement device; calibrating the laser measurement device; collecting a data measurement of the distance from the side of the swimming pool to the laser measurement device; rotating the laser measurement device laterally at a define angle to a new position using the rotary motor; and repeating the collecting of a data measurement, the storing of a data measurement, and the rotating to the new position until the laser measurement device has rotated 360°.

DETAILED DESCRIPTION

The present invention is an automated pool measuring method and apparatus that provides precise accurate measurements of a pool's dimensions quickly and efficiently. A quick scan by the invention will provide all the measurements needed to create a liner for even the most complicated pool shapes. The invention also reduces human errors such as the misreading of measurement tapes and the incorrect transcription of measurements to digital formats. The apparatus allows rapid collection of the pool dimensions, including automatic storage in digital format, thereby providing significant reductions in liner error rates.

Laser Measurement Device

In the example shown in FIGS. 2-5, the present invention includes a laser measurement device 60 that measures the perimeter 50 of a pool 10. The measurement device 60 includes a laser distance sensor 70 capable of emitting a laser beam 150. In this embodiment, the measurement device 60 includes a rotary motor 80, a microprocessor 90, a controller motor 100, a transmitter 110 and a battery 130. In other embodiments, the measurement device 60 may also include a cooling fan 140. The measurement device is adapted and/or configured to sit atop a standard tripod 120.

Generally, the laser distance sensor 70 is a time-of-flight optical device for measuring point-to-point distances. In one embodiment, it directs a laser beam 140 onto a remote surface and measures the time-of-flight required for the laser beam 140 to be reflected back to a sensor within the laser distance sensor 70. The laser distance sensor 70, in one embodiment, may record the time-of-flight measurements referenced earlier in a database or it may transmit the time-of-flight measurements to a microprocessor 90 with an accompanying database.

Figure 3:
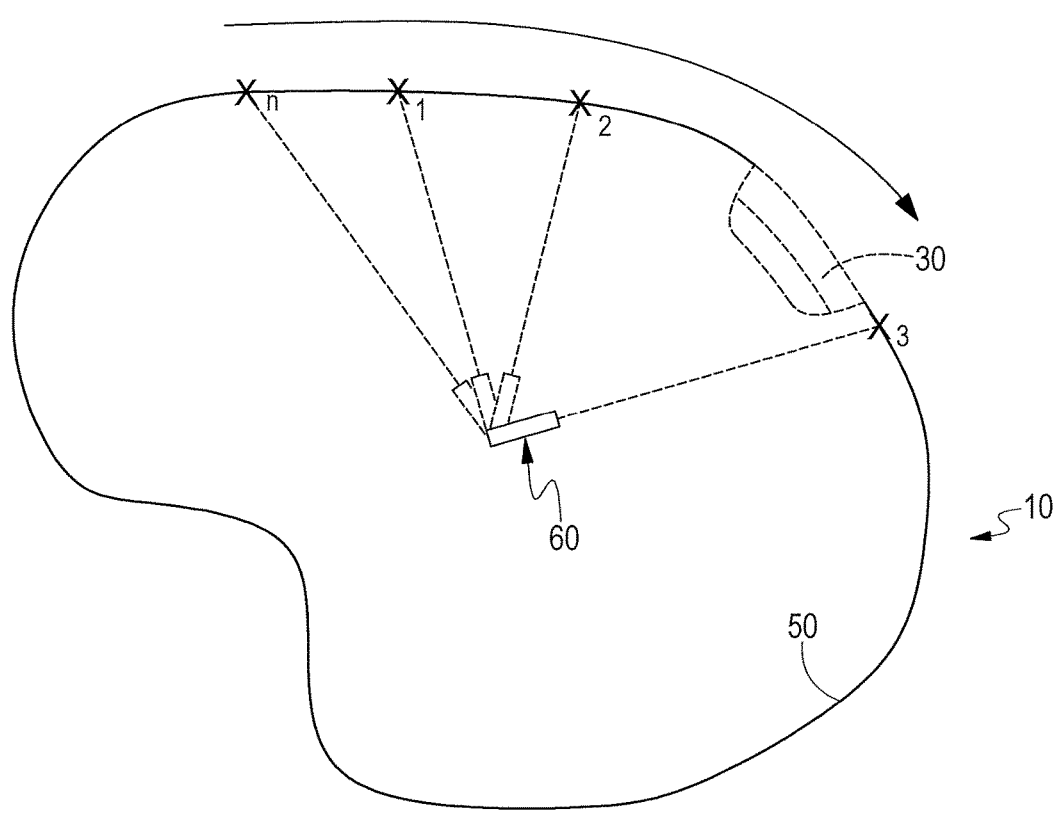
FIGS. 3 and 4 show diagrams of overhead views of the laser measurement device in operation in accordance with one embodiment of the present invention.
Figure 4:
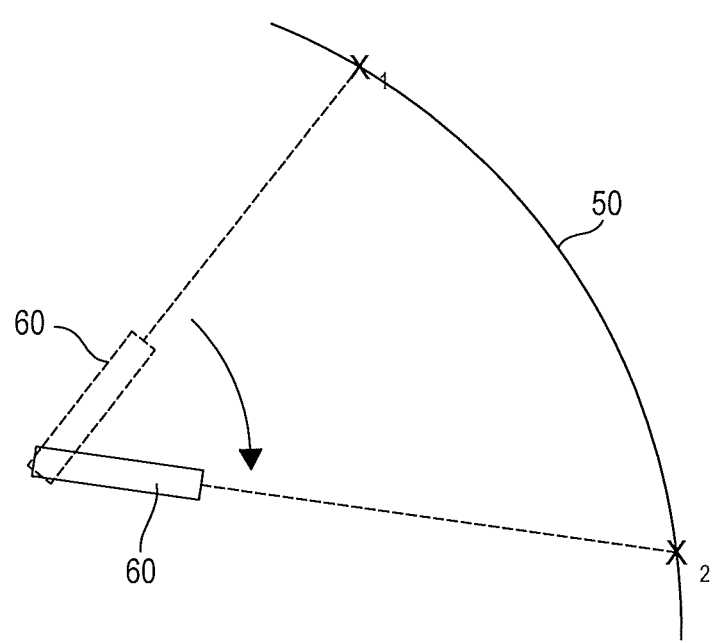

The rotary motor 80 is used to mechanically rotate the measurement device 60 about the x-axis 360 degrees in controlled angular steps. This allows the measurement device 60 to take time-of-flight, measurements about the perimeter 50 of a pool as shown in FIGS. 3 and 4. Specifically, as shown in these Figs., the measurement device 60 directs a laser beam 140 towards points X1, X2-$X_n$ and records and/or transmits the time-of-flight measurements associated with the distance between the measurement device 60 and each of the points X1, X2-$X_n$. The rotary motor 80 may be controlled by the microprocessor 90 such that the rotation about the x-axis is made in discrete steps and the corresponding points X1, X2-$X_n$ are spaced evenly around the perimeter 50. Each step is counted so that the angular position of the laser can be recorded. This angular position is used to calculate the measured point in two-dimensional coordinates.

In some embodiments, the rotary motor 80 is controlled such that upon each movement about the x-axis corresponds to 1 degree. It is possible however to take more refined or coarser measurements in that each movement about the x-axis could be 2-10 degrees (for quicker measurements) or less than 1 degree (for more refined and detailed measurements). In one embodiment, the measurement device may include a controller motor 100 which is pre-programmed such that each movement about the x-axis corresponds to 1 degree. In an alternate embodiment, the rotary motor 80 may be user programmed (either with or without a controller motor 100) such that the degree of movement per move about the x-axis is variable.

The microprocessor 90 may be a single processor or multiple processors. Additionally, the processor 90 may be in communication with a storage device or a storage medium. The processor executes an appropriate operating system such as Linux, Unix, Microsoft® Windows® and the like. The processor 90, and the storage device/medium, may advantageously contain control logic, or program logic, or other substrate configuration representing data and instructions, which cause the processor 90 to operate in a specific and predefined manner.

The measurement device 60 also includes a transmitter 110. The transmitter 110 is adapted and/or configured to transmit the time-of-flight measurements made by the laser distance sensor 70 and/or the microprocessor 90 to a mobile hand held device 115. In one embodiment, the transmitter and the mobile hand held device 115 may be on the same Wi-Fi network while in another embodiment, the transmitter 110 may transmit the time-of-flight measurements via Bluetooth™ or other low energy wireless transmission technology to a mobile hand held device 115 capable of receiving transmissions via Bluetooth™ or other wireless transmission protocols. In one embodiment, the mobile hand held device may be a "smart phone" such as an Apple iPhone™ or Samsung Galaxy™ device or a wireless tablet device such as an iPad™.

Figure 5:
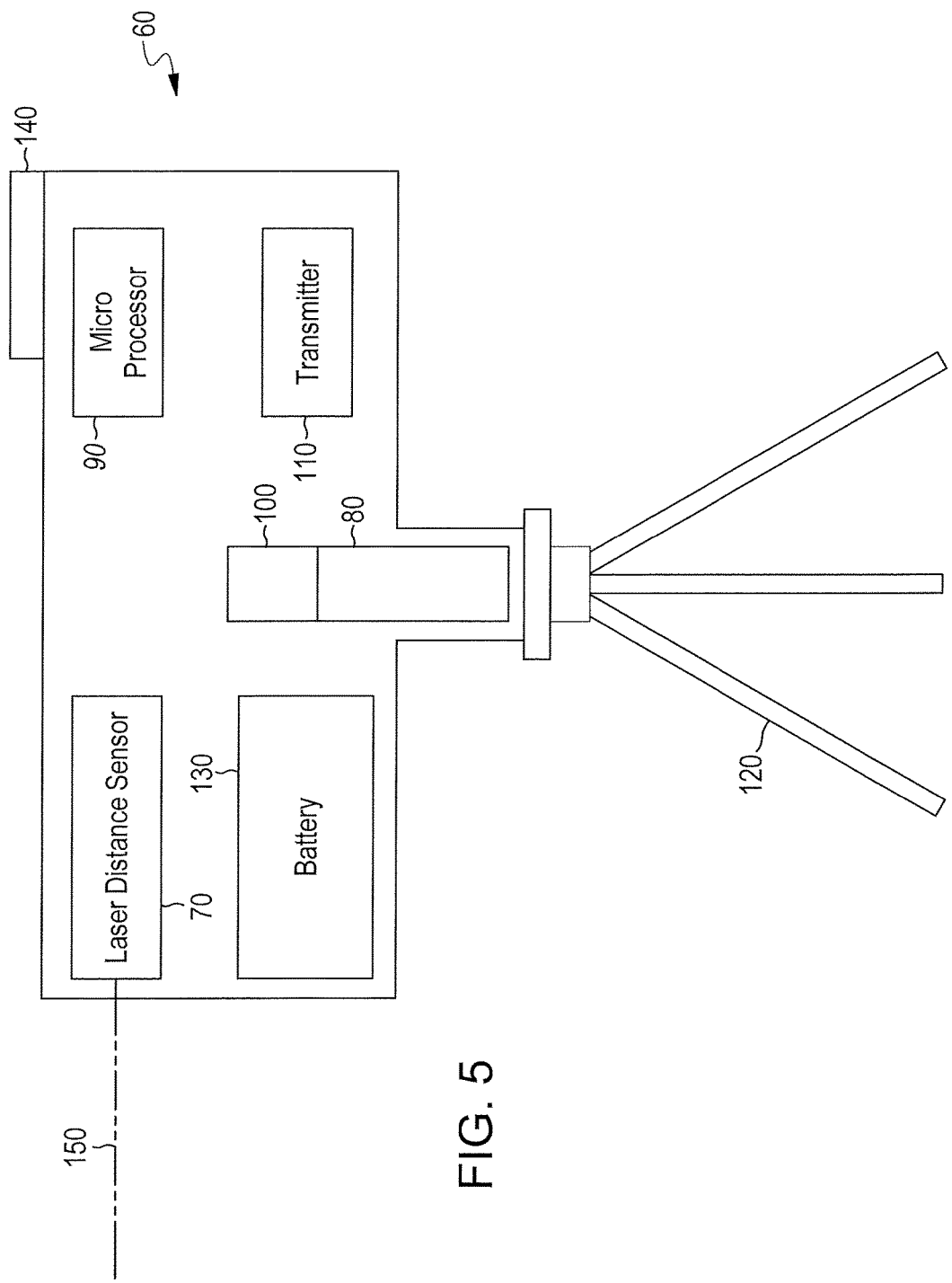
FIG. 5 shows a block diagram of the internal components of the laser measurement device in accordance with one embodiment of the present invention.

The mobile hand held device 115 may have an downloadable application (or "app") which is designed to receive the time-of-flight measurements made by the measurement device and re-transmit those time-of-flight measurements via a cellular network to a host server which may be housed at, or in communication with, the pool liner 40 manufacturer (as is discussed in more detail below). Additionally, in some embodiments, as shown in FIG. 5, the measurement device 60 may include a cooling fan 140 which aids in cooling the various electronic components housed comprising the measurement device 60. The apparatus may also include a battery charging function and the associated connectors and switches.

In particular, the computer programs described for the operation of the apparatus, when executed, enable a processor to perform and/or cause the performance of features of the present invention. The control logic may advantageously be implemented as one or more modules. The modules may advantageously be configured to reside on the storage device/medium and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like. The control logic conventionally includes the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art to effectively convey teachings and discoveries to others skilled in the art.

The control logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the processor.

Methods of Operation

As mentioned, the apparatus is controlled by an embedded microcontroller. The microcontroller accepts commands from the user, and operates the components within the apparatus according to those commands. The apparatus is intended to operate remotely while the user controls it from outside the pool. Therefore, it includes both a battery and a wireless transmitter. One embodiment uses a Wi-Fi connection allowing it to be controlled from a variety of laptops and handheld devices.

Figure 6:
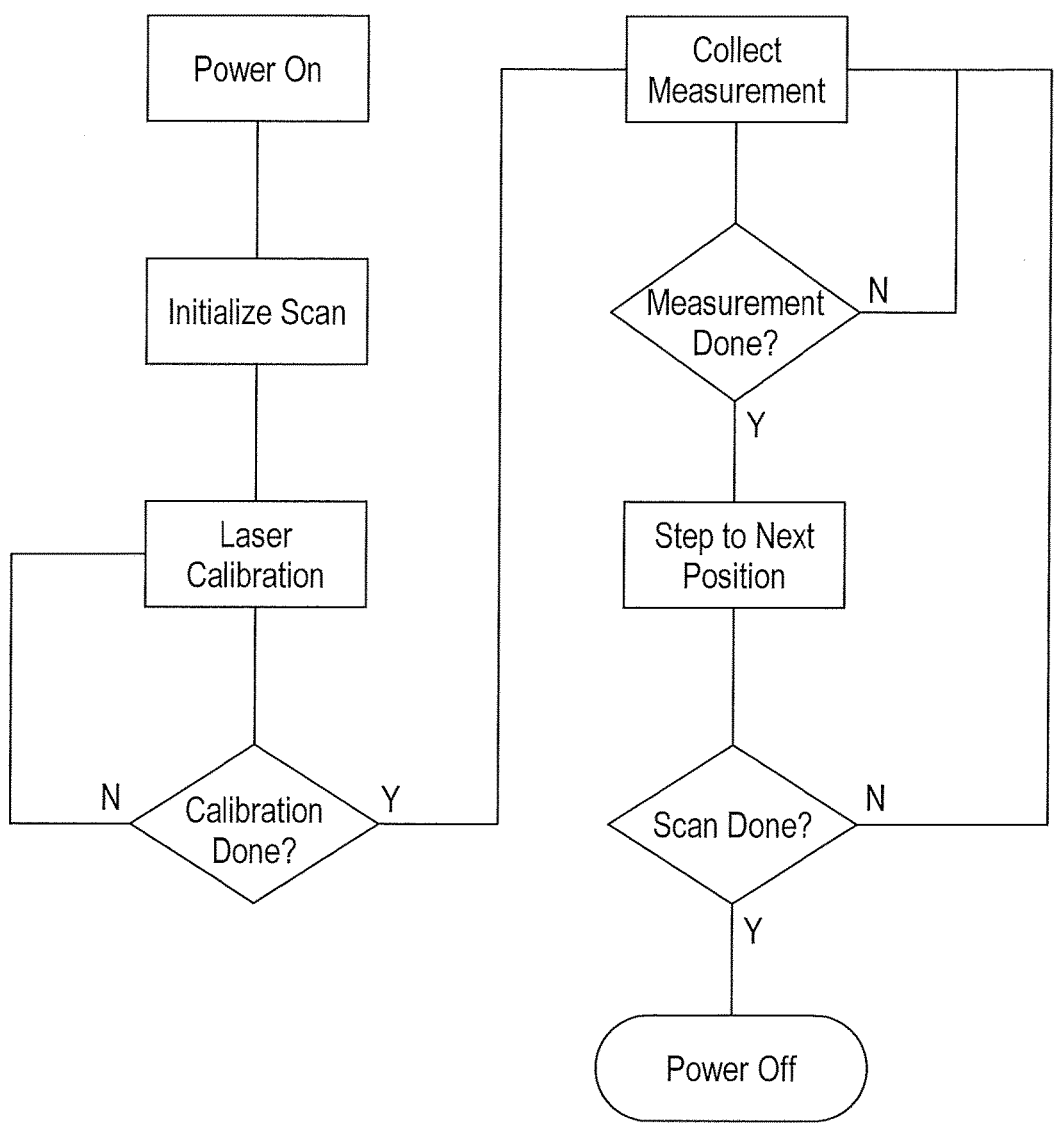
FIG. 6 shows a flowchart of the method of operation of the laser measurement device in accordance with one embodiment of the present invention.

As shown in FIG. 6, at the beginning of the scanning process, the microcontroller turns on the laser distance sensor and waits for the calibration to complete. Then, the microcontroller provides pulses to the motor controller to rotate through a certain number of steps to the first measurement location. This number of steps are user adjustable so that a variety of scan rates can be realized (e.g., fast coarse scans can be accomplished, high-resolution slower scans can be realized, and scan speeds between those extremes are possible). When the motor has turned to the first measurement location, the microcontroller begins accepting distance measurements from the laser. The microcontroller ignores a user-defined number of measurements to allow the system to settle, thus providing higher accuracy data at the expense of overall scan speed. This process is repeated until a full 360 degree scan is completed. In some embodiments, the process may be completed within 20 minutes and collect 1650 separate data measurements.

As noted, surface reflectivity, incident angle, and ambient light conditions can affect laser sensor performance. At times, the laser will stop to recalibrate and distance measurements are no longer provided to the microcontroller. The microcontroller will wait a user-defined period of time for a good measurement. If a measurement is not received, the system will move to the next point. This will continue until laser measurements are again received. While this leads to gaps in the measured pool outline, it also allows the scan to complete, with the gaps being filled in by a subsequent scan under different conditions.

Figure 7:
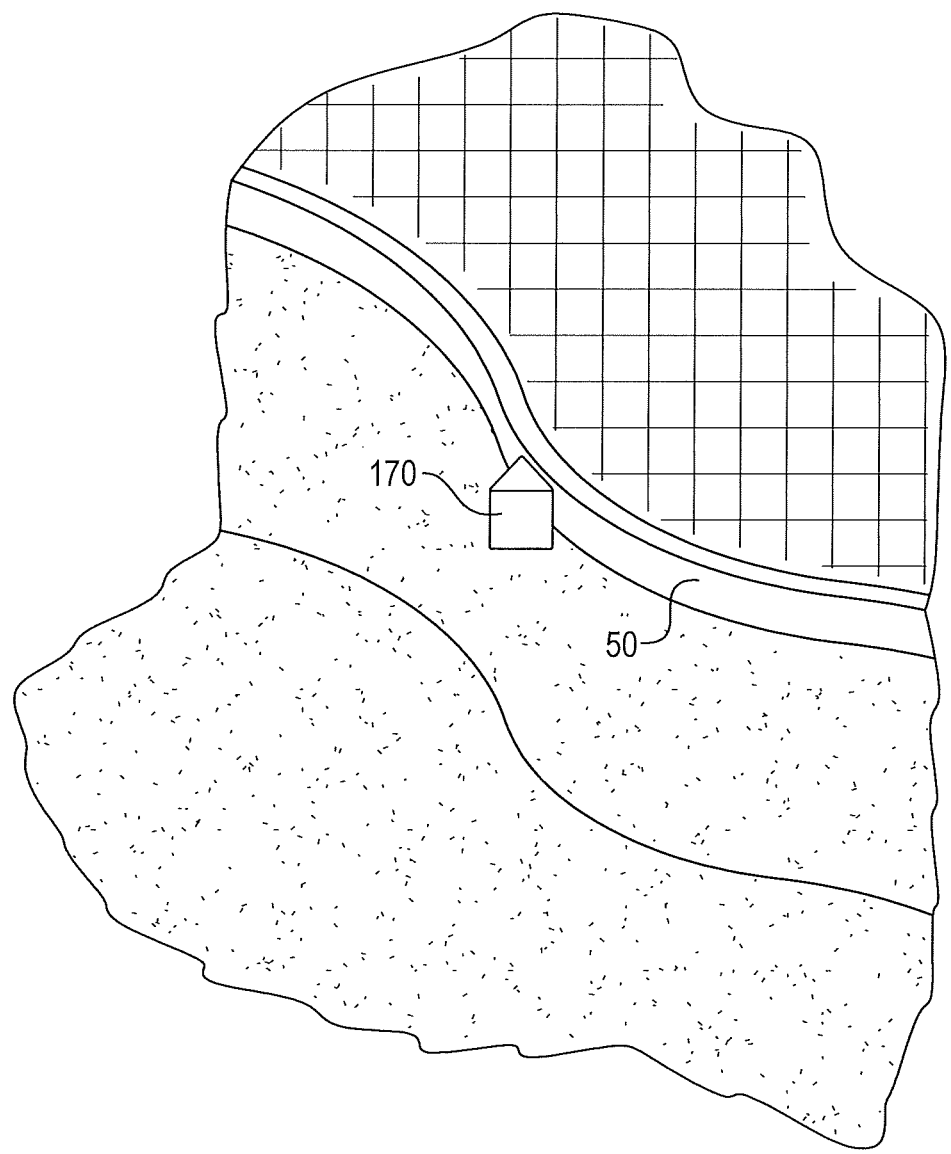
FIG. 7 shows a diagram of a break point marker in accordance with one embodiment of the present invention.

The method for apparatus use consists of first emptying the pool water level sufficiently to allow the laser sensor to be positioned at the same height as the bead track. The system is turned on and a high speed coarse scan is performed allowing the user to level the tripod. This leveling process is required so that the laser beam scans at a constant height of the pool wall. After the leveling process is complete, the user adheres specially designed "break point markers" 170 to the pool wall 50 as shown in FIG. 7. These break point markers will identify slope, depth changes, or other water features such as steps or benches in the pool outline. In some embodiments, the break point markers are 2" by 4" in size. After placing break point markers, the user sprays a specially formulated neutral reflectivity aerosol along the laser path. This spray-on material improves surface reflectivity, particularly under harsh light conditions and when scanning darkly colored, highly reflective, or highly angled surfaces. In one embodiment, this aerosol is a mixture flat white miscible oil paint that conforms to ASTM (American Society for Testing and Materials) D436, mixed at a ratio of 1 part flat white miscible oil paint to 2 parts water, and delivered using a standard hand sprayer. Other embodiments of this material are possible.

For example, the mixture could use diluted white children's finger paint.

Figure 8:
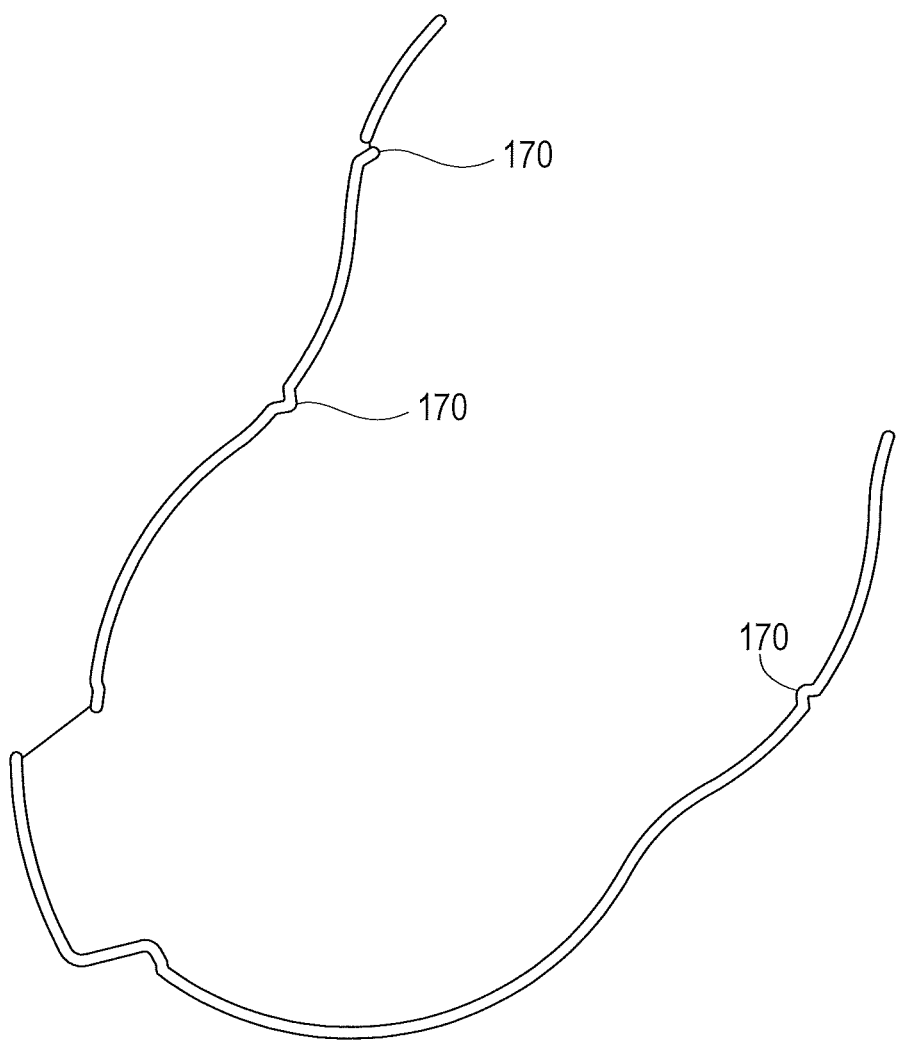
FIG. 8 shows the end result of a pool scan in accordance with one embodiment of the present invention.

During the scan, data from the apparatus is sent to the remote control device. The data consists of both the angular position of the device and the distance measured to the reflective surface. The remote control converts the data to a two-dimensional format using a standard coordinate transformation from Polar to Cartesian coordinates. The data is then plotted on the remote control device to enable a quick evaluation of the pool outline data. The data is also sent in electronic format to the designers of the pool liner in the form of a point cloud. Liner designers convert this point data cloud to a pool outline by a process of connecting various arc and lines to form a solid continuous outline. Break point markers 170 are incorporated into the drawing as per the customer's written depth or water feature specifications. FIG. 8 shows an example of the results of a pool scan 180.

Although particular embodiments of the present disclosure have been described, it is not intended that such references be construed as limitations upon the scope of this disclosure except as set forth in the claims.

We claim:

1. A method of measuring the perimeter of a swimming pool, comprising:
    placing a laser measurement device with a rotary motor on a tripod;
    locating and leveling the laser measurement device and the tripod in an empty swimming pool;
    treating the sides of the swimming pool with a diluted neutral reflectivity material to improve surface reflectivity;
    initiating a scan sequence on the laser measurement device;
    calibrating the laser measurement device;
    collecting a plurality of data measurements of the distance from the side of the swimming pool to the laser measurement device and storing the data measurements in an electronic storage medium, wherein there are more data;
    rotating the laser measurement device laterally at a define angle to a new position using the rotary motor, wherein the defined angle equals to approximately 1 degree so that at least 360 measurements are taken in a complete circular rotation of the laser measurement device; and
    repeating the collecting of a data measurement, the storing of a data measurement, and the rotating to a new position until the laser measurement device has rotated 360°;
    transmitting the stored data measurements to a remote hand held processor; and
    creating a scan image of a perimeter of the swimming pool perimeter with data measureme,nts that is suitable for designing a liner for the swimming pool.

2. The method of claim 1, where the neutral reflectivity material comprises a mixture flat white miscible oil paint that conforms to ASTM (American Society for Testing and Materials) D436.

3. The method of claim 1, where the neutral reflectivity material comprises diluted white children's finger paint.

4. The method of claim 1, where break point markers are attached to the side of the pool at points where a depth of the swimming pool changes.

5. The method of claim 4, where the depth of the swimming pool is measured manually.

6. A method of measuring the perimeter of a swimming pool, comprising:
    placing a laser measurement device with a rotary motor on a tripod;
    locating and leveling the laser measurement device and the tripod in an empty swimming pool;
    treating the sides of the swimming pool with a diluted neutral reflectivity material to improve surface reflectivity;
    initiating a scan sequence on the laser measurement device;
    calibrating the laser measurement device;
    collecting a plurality of data measurements of the distance from the side of the swimming pool to the laser measurement device and storing the data measurements in an electronic storage medium, wherein there are more data, wherein the data measurements are spaced evenly around the side of the swimming pool;
    rotating the laser measurement device laterally at a define angle to a new position using the rotary motor, and
    repeating the collecting of a data measurement, the storing of a data measurement, and the rotating to a new position until the laser measurement device has rotated 360°;
    transmitting the stored data measurements to a remote hand held processor; and
    creating a scan image of a perimeter of the swimming pool perimeter with data measurements that is suitable for designing a liner for the swimming pool.

\* \* \* \* \*